United States Patent [19]
Kluhsman

[11] Patent Number: 5,954,318
[45] Date of Patent: Sep. 21, 1999

[54] SUSPENSION ASSEMBLY HAVING DETENT NUT ADJUSTMENT

[75] Inventor: Melvin L. Kluhsman, Lockwood, Mo.

[73] Assignee: Kluhsman Machine, Inc., Lockwood, Mo.

[21] Appl. No.: 08/845,636

[22] Filed: May 1, 1997

[51] Int. Cl.⁶ .............. B60G 1/00; B60G 17/02; B60G 15/06
[52] U.S. Cl. .............. 267/175; 267/177; 267/221
[58] Field of Search .............. 267/34, 170, 175, 267/177, 179, 221

[56] References Cited

U.S. PATENT DOCUMENTS

| | | | |
|---|---|---|---|
| 3,701,544 | 10/1972 | Stankovich | 267/177 |
| 4,079,922 | 3/1978 | Nicholls | 267/34 |
| 4,348,016 | 9/1982 | Milly | 267/177 |
| 4,366,969 | 1/1983 | Benya et al. | 267/221 |
| 5,044,614 | 9/1991 | Rau | 267/221 |
| 5,553,836 | 9/1996 | Ericson | 267/286 |
| 5,722,645 | 3/1998 | Reitter | 267/177 |

OTHER PUBLICATIONS

AFCO Racing Products 1997; Racer Note; Coil–Over Kits; p. 22.

Primary Examiner—Chris Schwartz
Attorney, Agent, or Firm—Hovey, Williams, Timmons & Collins

[57] ABSTRACT

An adjustable coil over suspension assembly (10) for use in high-performance racing vehicles is provided which includes a central, telescopically intermitted suspension assembly (20) with an elongated coil spring (22) disposed over the assembly (20) and extending along the length thereof. Spring adjusting means (24) is provided for selective adjustment of the compression of spring (22) and includes a threadably mounted body (46) bearing against one end of the spring (22) and carrying a detent device (36, 56) for permitting rotation of the body (46) through a predetermined arc with seating of the body (46) after each such rotation. Accurate adjustment of the assembly (10) is assured because the operator can readily determine through perceptible "clicks" the degree of spring compression change during rotation of the body (46).

9 Claims, 1 Drawing Sheet

SUSPENSION ASSEMBLY HAVING DETENT NUT ADJUSTMENT

BACKGROUND OF THE INVENTION

1. Field of the Invention

The present invention is broadly concerned with an improved automotive suspension assembly for use in high-performance racing vehicles in order to provide easily adjustable suspension characteristics. More particularly, the invention pertains to such suspension assemblies including an elongated central suspension element with an elongated coil disposed about and extending along the length thereof; means for adjusting the tension of the spring is provided including a rotatable and axially shiftable body bearing against one end of the spring with a detent device operatively coupled with the body for permitting rotation of the latter through a predetermined arc with seating of the detent device after each such rotation. In this way, the user can accurately adjust spring compression either by hand or through the use of a simple spanner wrench.

2. Description of the Prior Art

High-performance racing vehicles are commonly provided with enhanced suspension devices for creating proper vehicle handling characteristics at high speeds. One such type of suspension device is known as a "coil over" eliminator and comprises an elongated central suspension unit such as a telescopically intermitted piston assembly, together with an exterior coil spring disposed about and extending along the length of the central suspension unit. In order to give a necessary degree of adjustability in such devices, it is known to provide threaded adjustment plate(s) adjacent one or both ends of the coil spring which can be rotated to alter the degree of spring compression.

In prior coil over devices, it is necessary to adjust the compression springs through the use of a wrench, which entails either jacking up the vehicle or sliding beneath the vehicle on a creeper. As can be appreciated, if such adjustments need to be made during a race, the latter alternative is followed. In this connection, it is particularly important that the coil over assemblies on opposite sides of a vehicle be adjusted to meet the demands of a particular race track or other racing conditions. That is, in certain instances, it may be desirable for enhanced handling that the coil over assembly adjacent one side of the vehicle be adjusted differently than the companion device at the other side of the vehicle. However, with prior coil over assemblies, it is very difficult to accurately ascertain the degree of spring adjustment, particularly if adjustments need to be made quickly during the course of a race.

SUMMARY OF THE INVENTION

The present invention overcomes the problems outlined above and provides an improved suspension assembly of the coil over type which has a spring adjusting means including a detent permitting rotation of the adjuster through a predetermined arc with seating of the detent device after each such rotation. In this manner, the user may readily ascertain the degree of spring compression by the number of "clicks" or seatings of the detent device during a given adjustment.

In more detail, the preferred suspension assembly of the invention comprises an elongated central suspension element having means adjacent the opposed ends thereof for coupling of the element between a pair of automotive structural members, with an elongated spring disposed about and extending along the length of the suspension element. The adjusting means for the spring includes an adjustment assembly proximal to one end of the spring and having a rotatable and axially shiftable body against one end of the spring. The detent device is operatively coupled with the body for permitting rotation of the latter through a predetermined arc with seating of the detent after each such rotation.

The central suspension element preferably includes an elongated piston rod telescopically interfitted within a tubular rod-receiving member, with the piston and member being relatively axially shiftable. Alternately, a high-performance shock absorber can be employed in this context.

Preferably, one end of the suspension element is threaded, and the adjustment body is threadably received thereon for axial movement of the body in response to rotation thereof. The preferred detent device comprises structure defining an elongated detent slot extending along the length of the threaded end of the suspension element, with a threaded detent screw carried by the body and received within the slot during each rotation through the predetermined arc.

DETAILED DESCRIPTION OF THE PREFERRED EMBODIMENT

Figure 1:
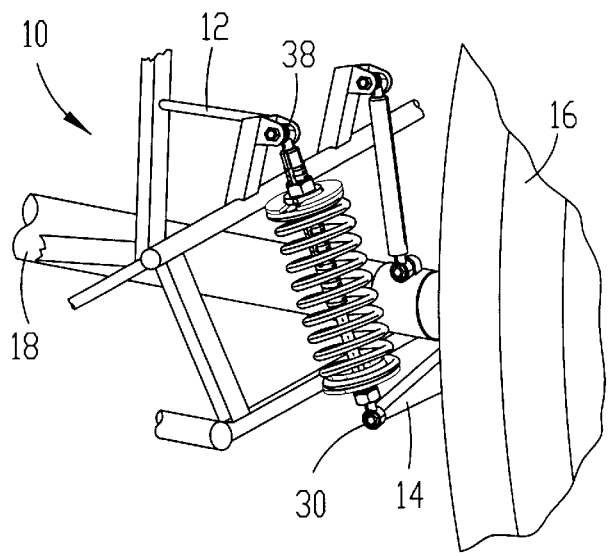
FIG. 1 is a fragmentary perspective view illustrating the preferred coil over suspension assembly of the invention, operatively coupled between automotive structural members for providing high-performance for the vehicle.
Figure 2:
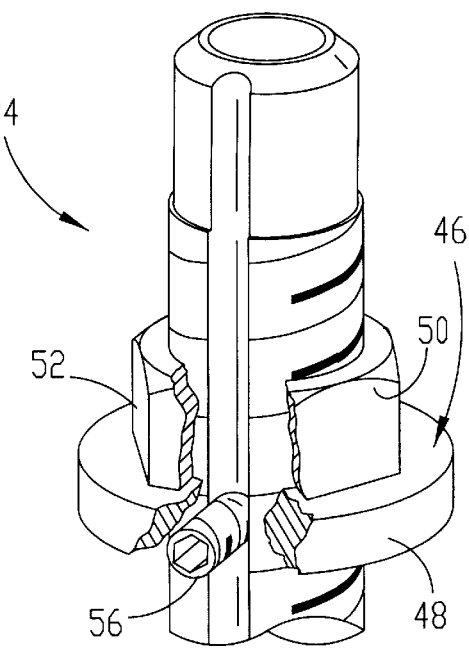
FIG. 2 is an elevational view of the preferred piston-type coil over suspension assembly, with a coil spring adjusting spanner wrench illustrated in phantom.
Figure 2:
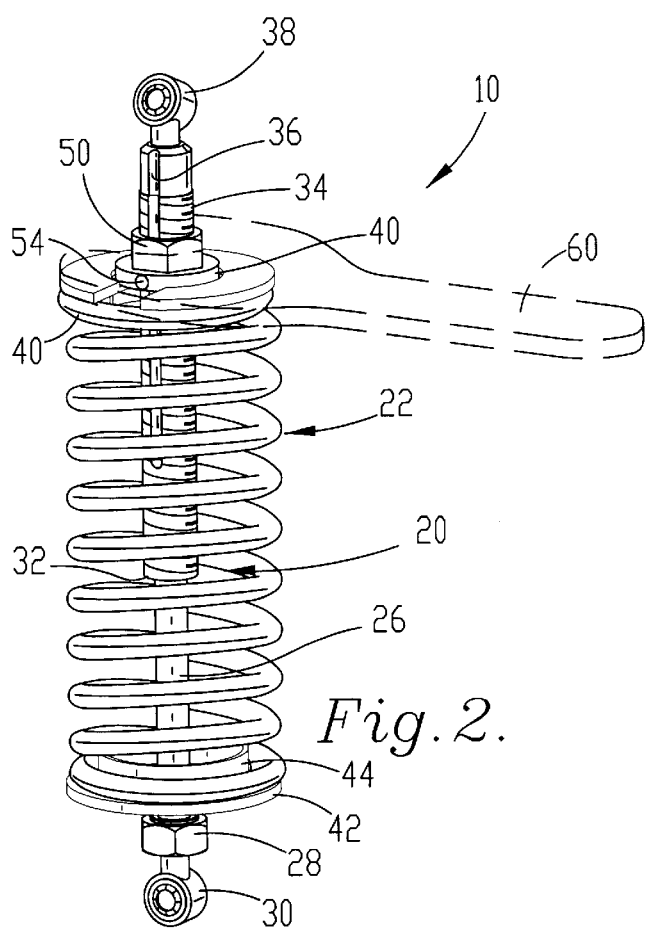

Turning now to the drawings, and particularly FIGS. 1-2, a coil over automotive suspension assembly 10 is illustrated. As shown in FIG. 1, the assembly 10 is designed for providing high-performance vehicles with adjustable suspension characteristics, i.e., to selectively adjust the weight distribution of the vehicle to the respective corners thereof for altering the handling and cornering properties of the vehicle. To this end, the assembly 10 is designed for interconnection between conventional automotive structural members 12, 14 provided proximal to the rear tires 16 and rear axle 18 of a racing vehicle, so that the vehicle is provided with a matched pair of the assemblies.

Figure 3:
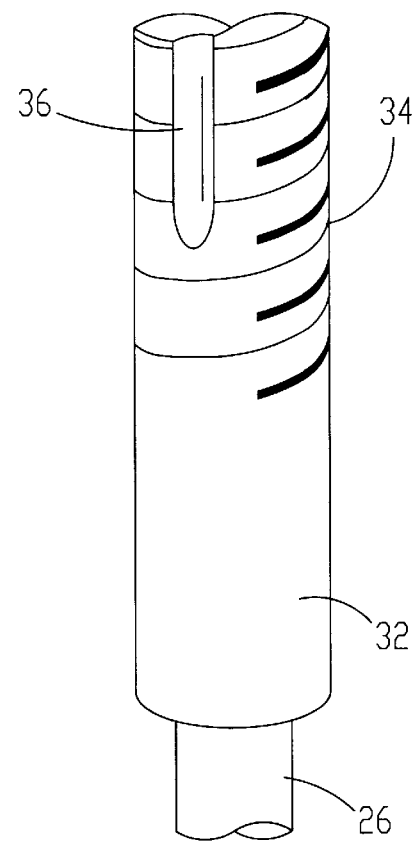
FIG. 3 is a greatly enlarged, fragmentary view of the threaded spring adjustment end of the preferred suspension assembly, with parts broken away to illustrate the preferred detent device.

Referring specifically to FIGS. 2 and 3, it will be seen that the assembly 10 includes an elongated, relatively shiftable central suspension element 20, an elongated coil spring 22 disposed over and extending along the length of element 20, and end-mounted adjustment means 24 for selectively adjusting the compression of spring 22.

The suspension element 20 in the form shown includes an elongated lower solid metallic piston rod 26 equipped with a threaded lower end 28 carrying an annular coupler 30 of conventional design. The overall element 20 further includes an upper, tubular piston rod-receiving member 32 provided with external threading 34 along a substantial portion of the length thereof. This threading 34 is interrupted by an elongated detent slot 36 extending from the upper end of the member 32 throughout the majority of the length of external threading 34 (see FIG. 3). The uppermost end of member 32 also carries an annular coupler 38.

As shown, the coil spring 22 is disposed about and receives the telescopically interfitted piston rod 26 and member 32, and likewise extends substantially the entire length of these components. A pair of upper and lower annular spring plates 40, 42 are respectively received over the member 32 and rod 26 as shown, and bear against and engage the opposed upper and lower ends of spring 22. Each of the plates 40, 42 includes an inboard, projecting, annular spring alignment extension 44 which aids in maintaining the location of spring 22 relative to the element 20.

Attention is next directed to FIG. 3 which illustrates in detail the adjusting means 24. This adjusting means includes an annular, internally threaded body 46 threadably received on threading 34 of member 32. The body 46 includes a radially extending plate segment 48 as well as an upstanding nut portion 50 provided with external wrench flats 52. The segment 48 is provided with a threaded radial bore 54 (see FIG. 2) which receives a threaded detent screw 56. As shown in FIG. 3, the inner end 58 of the screw 56 is designed to seat within slot 36 during each rotation of the body 46 through a 360° arc.

In the use of assembly 10 when the latter is operatively coupled to a vehicle as shown in exemplary FIG. 1, the suspension characteristics of the assembly may be readily altered through simple rotation of body 46. During each full rotation of the body 46, the inner end 58 of detent screw 56 comes into contact and seats within slot 36. This generates a perceptible "click" or feel to the operator so that the operator can adjust the overall assembly 10 to a predetermined, known degree. In this connection, the screw 56 is preferably adjusted relative to slot 36 so that, when the vehicle is jacked up, the body 46 can be rotated by hand. When the vehicle is not jacked up, use can be made of a simple banner wrench 60 which engages the wrench flats 52 of nut portion 50, so as to permit adjustment of the body 46. In either case however, the user can readily ascertain the degree of adjustment of the assembly 10 simply through the "click" and feel of the detent device during each rotation of body 46.

I claim:

1. An automotive suspension assembly comprising:
   an elongated central suspension element including a detent slot and couplers adjacent the opposed ends thereof, said couplers operative for coupling of the element between a pair of automotive structural members;
   an elongated coil spring disposed about and extending along the length of said suspension element; and
   an adjustment assembly for adjusting the compression of said spring said adjustment being proximal to one end of the spring and said assembly including a rotatable and axially shiftable body bearing against said one end of said spring, and a detent screw operatively coupled with said body for permitting rotation of the body through a predetermined arc with seating of the detent screw within said detent slot after each such rotation of the body through said predetermined arc, the sealing of said detent screw within said detent slot generating a perceptible indication whereby the suspension assembly may be adjusted to a known extent by virtue of such perceptible indication.

2. The automotive suspension of claim 1, wherein one end of said suspension element is threaded, said adjustment assembly body threadably received on said threaded end for axial movement of the body in response to rotation thereof.

3. The automotive suspension of claim 2, said adjustment assembly body comprising an annular bearing plate with a nut portion presenting wrench flats.

4. The automotive suspension of claim 2, said detent screw comprising structure defining an elongated detent slot extending along the length of said threaded end, and said detent screw being threaded and carried by said body and received within said slot during each rotation of the body through said predetermined arc.

5. The automotive suspension assembly of claim 1, said suspension element comprising an elongated piston rod telescopically interfitted within a tubular rod-receiving member, said piston rod and rod-receiving member being relatively axially shiftable.

6. The automotive suspension of claim 1, said suspension assembly comprising a pair of annular spring-engaging end plates respectively received on said suspension element and engaging the opposed ends of said spring, said adjustment body bearing. against one of said plates.

7. In a coil over suspension device including an elongated suspension element at least one end of which is threaded, couplers for coupling the suspension element between a pair of automotive structural members, a coil spring substantially extending along the length of and telescoped over the element, and an adjustment assembly including an axially shiftable rotatable body threadably received on the threaded end of the element and operable for bearing against one end of the spring, the improvement comprising:
   walls provided in said element presenting a detent slot extending vertically along said threaded end of said element; and
   a detent screw coupled with said rotatable body and operable for permitting rotation of said body about a predetermined arc and for seating within said detent slot when said detent screw and said detent slot are in alignment, said seating generating a perceptible indication when said detent screw seats in said detent slot such that for each fall rotation of said body, said detent screw seats one time and generates one indication thereby allowing the operator adjusting said adjustable body to readily ascertain the degree of adjustment of the assembly.

8. An automotive suspension assembly comprising:
   an elongated central suspension element including couplers adjacent the opposed ends thereof for coupling of the element between a pair of automotive structural members;
   an elongated coil spring disposed about and extending along the length of said suspension element; and
   an adjustment assembly including a rotatable and axially shiftable body bearing against one end of said spring, and a detent device operatively coupled with said body for permitting rotation of the body through a predetermined arc with seating of the detent device after each such rotation of the body through said predetermined arc,
   said adjustment body comprising an annular bearing plate with a nut portion presenting wrench flats.

9. An automotive suspension assembly comprising:
   an elongated central suspension element including couplers adjacent the opposed ends thereof for coupling of the element between a pair of automotive structural members;
   an elongated coil spring disposed about and extending along the length of said suspension element; and
   an adjustment assembly including a rotatable and axially shiftable body bearing against one end of said spring, and a detent device operatively coupled with said body for permitting rotation of the body through a predetermined arc with seating of the detent device after each such rotation of the body through said predetermined arc, one end of said suspension element being threaded, said adjustment body threadably received on said one threaded end for axial movement of the body in response to rotation thereof, said detent device comprising structure defining an elongated detent slot extending along the length of said threaded end, and a threaded detent screw carried by said body and received within said slot during each rotation of the body through said predetermined arc.

* * * * *